United States Patent
Fujino et al.

(10) Patent No.: US 6,660,583 B2
(45) Date of Patent: Dec. 9, 2003

(54) PROCESS FOR PRODUCING ACTIVATED CARBON FOR ELECTRODE OF ELECTRIC DOUBLE-LAYER CAPACITOR, AND CARBON MATERIAL

(75) Inventors: Takeshi Fujino, Wako (JP); Shigeki Oyama, Wako (JP); Kenji Sato, Wako (JP); Minoru Noguchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/152,989

(22) Filed: May 23, 2002

(65) Prior Publication Data

US 2003/0139009 A1 Jul. 24, 2003

(30) Foreign Application Priority Data

May 24, 2001 (JP) ........................ 2001-155626
Apr. 25, 2002 (JP) ........................ 2002-124675

(51) Int. Cl.⁷ ........................................ H01L 21/8242
(52) U.S. Cl. ........................................ 438/253
(58) Field of Search .................... 438/253; 502/416, 502/502

(56) References Cited

U.S. PATENT DOCUMENTS

| | | | | |
|---|---|---|---|---|
| 6,547,990 B2 | * | 4/2003 | Shinozaki et al. | ........... 252/502 |
| 2002/0052293 A1 | * | 5/2002 | Tsuryya et al. | ............. 502/416 |
| 2002/0075627 A1 | * | 6/2002 | Shinozaki et al. | ........... 361/302 |
| 2002/0102464 A1 | * | 8/2002 | Yoshida et al. | ............. 429/300 |
| 2002/0126439 A1 | * | 9/2002 | Sato et al. | ................... 361/502 |

FOREIGN PATENT DOCUMENTS

JP          2000-77273          3/2000

* cited by examiner

Primary Examiner—David Nelms
Assistant Examiner—Thao P Le
(74) Attorney, Agent, or Firm—Arent Fox Kintner Plotkin & Kahn, PLLC

(57) ABSTRACT

Activated carbon for an electrode of an electric double-layer capacitor is produced by subjecting a carbon material sequentially to a carbonizing treatment and an alkali activating treatment, and by using a carbon material. The carbon material used is a condensed polycyclic aromatic compound (CPAC) which has a condensed ring (CR) and at least one aliphatic hydrocarbon radical (R) bonded to said condensed ring (CR). The condensed ring (CR) includes at least one alicyclic hydrocarbon structure moiety (ALC). In an analysis chart resulting from a ¹³C-NMR spectroscopy of the condensed polycyclic aromatic compound, a signal intensity ratio $I_L/I_R$ is equal to or larger than 0.2, and a signal intensity ratio $I_C/I_R$ is equal to or larger than 0.14, wherein $I_R$ represents a signal intensity of an aromatic peak; $I_L$ represents a signal intensity of an aliphatic hydrocarbon peak; and $I_C$ represents a signal intensity of an alicyclic hydrocarbon peak. Thus, activated carbon of a low electrostatic capacity revealing voltage and a high electrostatic capacity density (F/cc) can be produced by using a particular carbon material.

2 Claims, 5 Drawing Sheets

# PROCESS FOR PRODUCING ACTIVATED CARBON FOR ELECTRODE OF ELECTRIC DOUBLE-LAYER CAPACITOR, AND CARBON MATERIAL

BACKGROUND OF THE INVENTION

1. Field of the Invention

The present invention relates to a process for producing activated carbon for an electrode of an electric double-layer capacitor, and to carbon material for used in such process.

2. Description of the Related Art

To produce such a type of activated carbon, a process is conventionally used, in which a carbon material such as petroleum and coal carbon materials is subjected sequentially to a carbonizing treatment and an alkali activating treatment (for example, see Japanese Patent Application Laid-open No. 2000-77273).

However, since activated carbon for an electrode produced using a carbon material as described above has an electrostatic capacity revealing voltage of as high as 4 V, there is a possibility of the following problems: the expansion amount of two electrodes is increased due to the application of a high voltage, so that a large load is applied to a case of a capacitor, leading to a possibility that the deformation and/or fracture of the case and the short-circuit between the two electrodes, and to a possibility that an electrolyte is decomposed to increase the internal resistance and thus increase the resistance of the capacitor.

SUMMARY OF THE INVENTION

Accordingly, it is an object of the present invention to provide a process capable of producing activated carbon for an electrode of a low electrostatic capacity revealing voltage and a high electrostatic capacity density (F/cc) by using a particular carbon material.

To achieve the above object, according to the present invention, there is provided a process for producing activated carbon for an electrode of a electric double-layer capacitor, comprising the steps of: subjecting a carbon material to a carbonizing treatment; and then subjecting the carbon material to an alkali activating treatment; wherein the carbon material used is a condensed polycyclic aromatic compound which has a condensed ring and at least one aliphatic hydrocarbon radical bonded to said condensed ring, said condensed ring including at least one alicyclic hydrocarbon structure moiety; and wherein, in an analysis chart resulting from a $^{13}$C-NMR spectroscopy of the condensed polycyclic aromatic compound, a signal intensity ratio $I_L/I_R$ is equal to or larger than 0.2, and a signal intensity ratio $I_C/I_R$ is equal to or larger than 0.14, wherein $I_R$ represents a signal intensity of an aromatic peak; $I_L$ represents a signal intensity of an aliphatic hydrocarbon peak; and $I_C$ represents a signal intensity of an alicyclic hydrocarbon peak.

With the above process, it is possible to produce activated carbon for an electrode of a low electrostatic capacity revealing voltage and a high electrostatic capacity density (F/cc). However, if $I_L/I_R<0.2$ or $I_C/I_R<0.14$, the electrostatic capacity density (F/cc) is reduced.

According to the present invention, there is provided a carbon material for use in the production of activated carbon for en electrode of an electric double-layer capacitor, which is a condensed polycyclic aromatic compound having a condensed ring and at least one aliphatic hydrocarbon radical R bonded to the condensed ring, the condensed ring including at least one alicyclic hydrocarbon structure moiety, the condensed polycyclic aromatic compound providing, as a result of a $^{13}$C-NMR spectroscopy thereof, an analysis chart in which a signal intensity ratio $I_L/I_R$ is equal to or larger than 0.2, and a signal intensity ratio $I_C/I_R$ is equal to or larger than 0.14, wherein $I_R$ represents a signal intensity of an aromatic peak; $I_L$ represents a signal intensity of an aliphatic hydrocarbon peak; and $I_C$ represents a signal intensity of an alicyclic hydrocarbon peak.

This carbon material is suitable as a source material for activated carbon for an electrode, as described above.

The above and other objects, features and advantages of the invention will become apparent from the following description of the preferred embodiment taken in conjunction with the accompanying drawings.

DESCRIPTION OF THE PREFERRED EMBODIMENT

Figure 1:
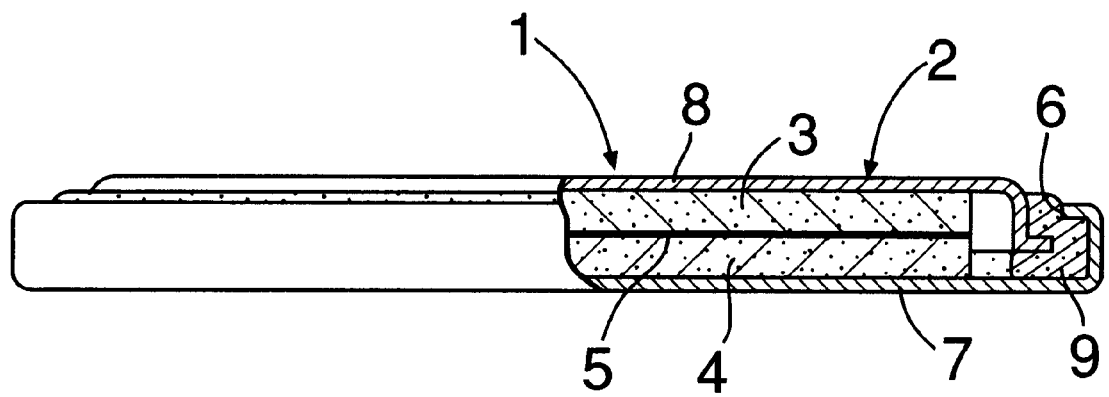
FIG. 1 is a front partially broken-away view of an essential portion of a button-type electric double-layer capacitor.

Referring to FIG. 1, a button-type electric double-layer capacitor 1 includes a case 2, a pair of polarizing electrodes 3 and 4 accommodated in the case 2, a spacer 5 sandwiched between the polarizing electrodes 3 and 4, and an electrolyte filled in the case 2. The case 2 comprises a body 7 made of aluminum and having an opening 6, and a lid plate 8 made of aluminum for closing the opening 6. An outer periphery of the lid plate 8 and an inner periphery of the body 7 are sealed from each other by a seal material 9. Each of the polarizing electrodes 3 and 4 is made of a mixture comprising activated carbon for an electrode, a conductive filler and a binder.

The activated carbon for the electrode is produced in the following process: The activated carbon is produced by sequentially carrying out steps of: spinning a carbon material to form a fiber, or pulverizing the carbon material to form a powder; subjecting the carbon material to an oxygen crosslinking treatment; subjecting the carbon material resulting from oxygen crosslinking treatment to a carbonizing treatment to provide a carbonized material; subjecting the carbonized material to a pulverizing treatment; subjecting the pulverized carbonized material to an alkali activating treatment; and washing, filtering and drying the resultant material.

Figure 2:
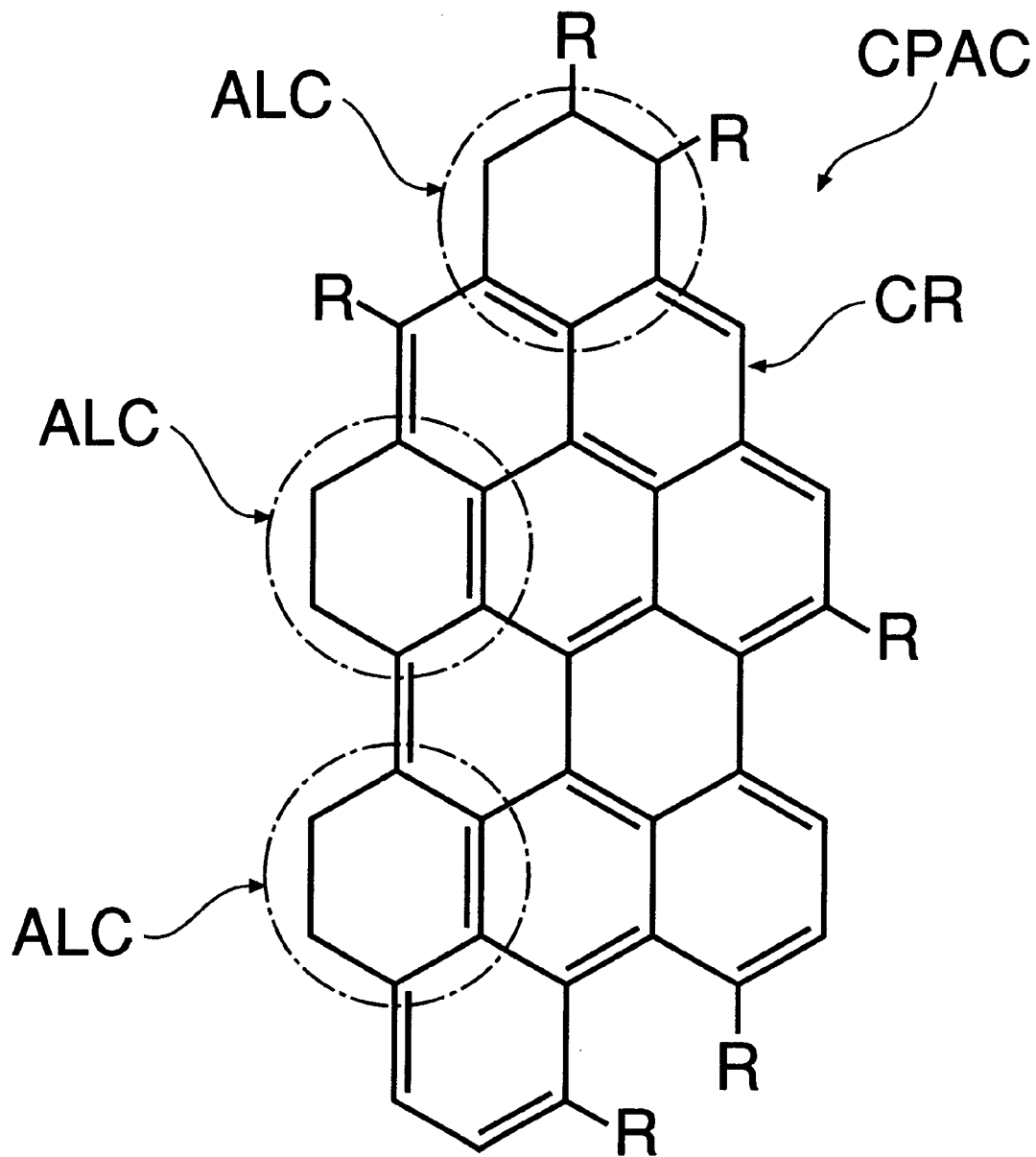
FIG. 2 shows a chemical formula of a carbon material.

The carbon material used is a condensed polycyclic aromatic compound CPAC which has a condensed ring CR and at least one aliphatic hydrocarbon radical R bonded to the condensed ring CR, the condensed ring CR including at least one alicyclic hydrocarbon structure moiety ALC, as shown in FIG. 2. The condensed polycyclic aromatic compound CPAC is characterized in that a $^{13}$C-NMR spectroscopy thereof provides an analysis chart in which a signal intensity ratio $I_L/I_R$ is equal to or larger than 0.2, and a signal intensity ratio $I_C/I_R$ is equal to or larger than 0.14, wherein $I_R$ represents a signal intensity of an aromatic peak; $I_L$ represents a signal intensity of an aliphatic hydrocarbon peak; and $I_C$ represents a signal intensity of an alicyclic hydrocarbon peak.

The aliphatic hydrocarbon radical R which is a side chain includes alkane, alkene and, alkyne, and corresponds, for example, to —$CH_3$, —$C_2H_5$, —CH=$CH_2$, —C≡CH and the like. The alicyclic hydrocarbon structure moiety ALC corresponds to, for example, cyclohexane ($C_6H_{12}$), cyclohexane ($C_6H_{10}$), cyclopentane ($C_5H_{10}$), cyclopentene ($C_5H_8$) and the like.

The carbon material is synthesized using any of naphthalene, anthracene, pyrene, their derivatives and the like as a source material. Examples of the derivatives are 1-methylnaphthalene, 2-ethylnaphthalene, 1-ethylnaphthalene, 1,2-dimethylnaphthalene, 1,3-dimethylnaphthalene, 1,4-dimethylnaphthalene, 1,5-diethylnaphthalene, 1,6-dimethylnaphthalene, 1,7-dimethylnaphthalene, 1,8-dimethylnaphthalene, 2,3-dimethylnaphthalene, 2,6-dimethylnaphthalene, 2,7-dimethylnaphthalene, 1,6,7-trimethylnaphthalene, 2-methylanthracene, 9-methylanthracene and the like. On the other hand, the carbon material can be produced by subjecting the aromatic ring of a condensed polycyclic aromatic compound extracted from a natural organic compound such as petroleum pitch, coal pitch and the like, to a ring-opening treatment. However, the natural organic compound contains metal impurities such as Fe, Al, Si, V, Mg, Na, Ca and the like and other impurities in relatively large amounts, and when a large amount of metal impurities are contained in the carbon material, there is a possibility that they act as activating points in the alkali activating treatment to affect the distribution of pores in the activated carbon, and further they remain in and react with activated carbon, thereby bringing about disadvantages such as a reduction in electrostatic capacity of an electric double-layer capacitor, generation of a gas, increase in resistance and the like. Therefore, it is desirable that the amount of impurities other than C, O, H and S contained in the carbon material is equal to or smaller than 100 ppm.

In addition, it is desirable that the carbon material is an aggregate of molecule clusters having an orientation property (i.e., consists of stacking of aromatic molecules). Therefore, an average molecular weight M of the carbon material is equal to or larger than 200, preferably, in a range of $500 \leq M \leq 10,000$, and a softening point $T_s$ of the carbon material is in a range of $140° \leq T_s \leq 300°$ C., preferably, equal to or lower than 270° C.

A ball mill, a jet mill, a high-speed rotation mill (e.g., a labo-cutter mill) or the like is used to pulverize the carbon material.

The oxygen crosslinking treatment is carried out to crosslink the benzene rings of the adjacent condensed polycyclic aromatic compounds with each other through oxygen, whereby the alkali activating reaction can occur uniformly in the carbonized material.

An oxygen crosslinking rate $D_L$ is represented by $D_L=\{(W_2-W_1)/W_1\}\times100(\%)$, which varies according to the molecular structure of the carbon material, wherein $W_1$ represents a weight of the carbon material before being subjected to the oxygen crosslinking treatment, and $W_2$ represents a weight of the carbon material after being subjected to the oxygen crosslinking treatment. The oxygen crosslinking rate $D_L$ is set in a range of $0.01\% \leq D_L \leq 10\%$. In this case, if $D_L<0.1\%$, the meaning of carrying out the oxygen crosslinking is lost. On the other hand, if $D_L>10\%$, there is a possibility that carbon is burned during the carbonizing treatment to bring about a reduction in yield. To obtain the oxygen crosslinking rate $D_L$ in the above-described range, a heating temperature T is set in a range of 140° C.$\leq T \leq$350° C. and a heating time t is set in a range of $10^{-3}$ hr$\leq t \leq$10 hr in the oxygen crosslinking treatment in the presence of oxygen current. The heating time T is set based the softening point $T_s$ of the carbon material. The oxygen crosslinking treatment may be carried out at a single stage or at a plurality of stages. A high-molecular substance, $NO_2$ and the like which are derived from, for example, $P_2O_5$, quinone, hydroquinone, and hydroquinone derivatives, may be used as the crosslinking agent. Even if the oxygen crosslinking treatment is not carried out, activated carbon can be produced.

The carbonizing treatment is carried out in the presence of an inert gas at a heating temperature T set in a range of 500° C.$\leq T \leq$1,000° C. for a heating time t set in a range of $10^{-3}$ hr$\leq t \leq$5 hr. This produces a carbonized material having a true density d in a range of 1.3 g/cc$\leq d \leq$1.9 g/cc. The fact that the carbonized material has a true density d in such range is effective for subjecting the carbonized material uniformly to the alkali activating treatment.

A pulverizer such as a ball mill, a jet mill, a high-speed rotation mill (e.g., a labo-cutter mill) or the like is used in the pulverizing treatment. The powdery carbonized material has an average particle size $D_P$ set in a range of 1 $\mu$m$\leq D_P \leq$50 $\mu$m, and the efficiency of the alkali activating treatment can be enhanced by carrying out such a particle size regulation.

KOH is used as a treating agent for the alkali activating treatment, and in the alkali activating treatment in an inert gas atmosphere, the heating temperature T is set in a range of 600° C.$\leq T \leq$1,000° C., and the heating time t is set in a range of $10^{-3}$ hr$\leq t \leq$10 hr. The heating temperature T is preferably in a range of 730° C.$\leq T \leq$900° C. If T<730° C., there is a possibility that activated carbon having a high electrostatic capacity density (F/cc) is not produced. Activated carbon for an electrode having a specific surface area A as measured by a nitrogen gas adsorption process (which will be referred simply to as a specific surface area A) equal to or smaller than 550 m$^2$/g and a pore volume VP equal to or smaller than 0.29 cc/g is produced by carrying out the above-described various operations after the alkali activating treatment. The alkali activating treatment is carried out at a single stage or at a plurality of stages.

If required, the powdery carbonized material may be subjected to a heating treatment at a heating temperature set in a range of 400° C.≦T≦450° C. for a heating time t set in a range of 0.5 hr≦t≦10 hr for the dehydration thereof prior to the above-described heating at the high temperature.

Figure 3:
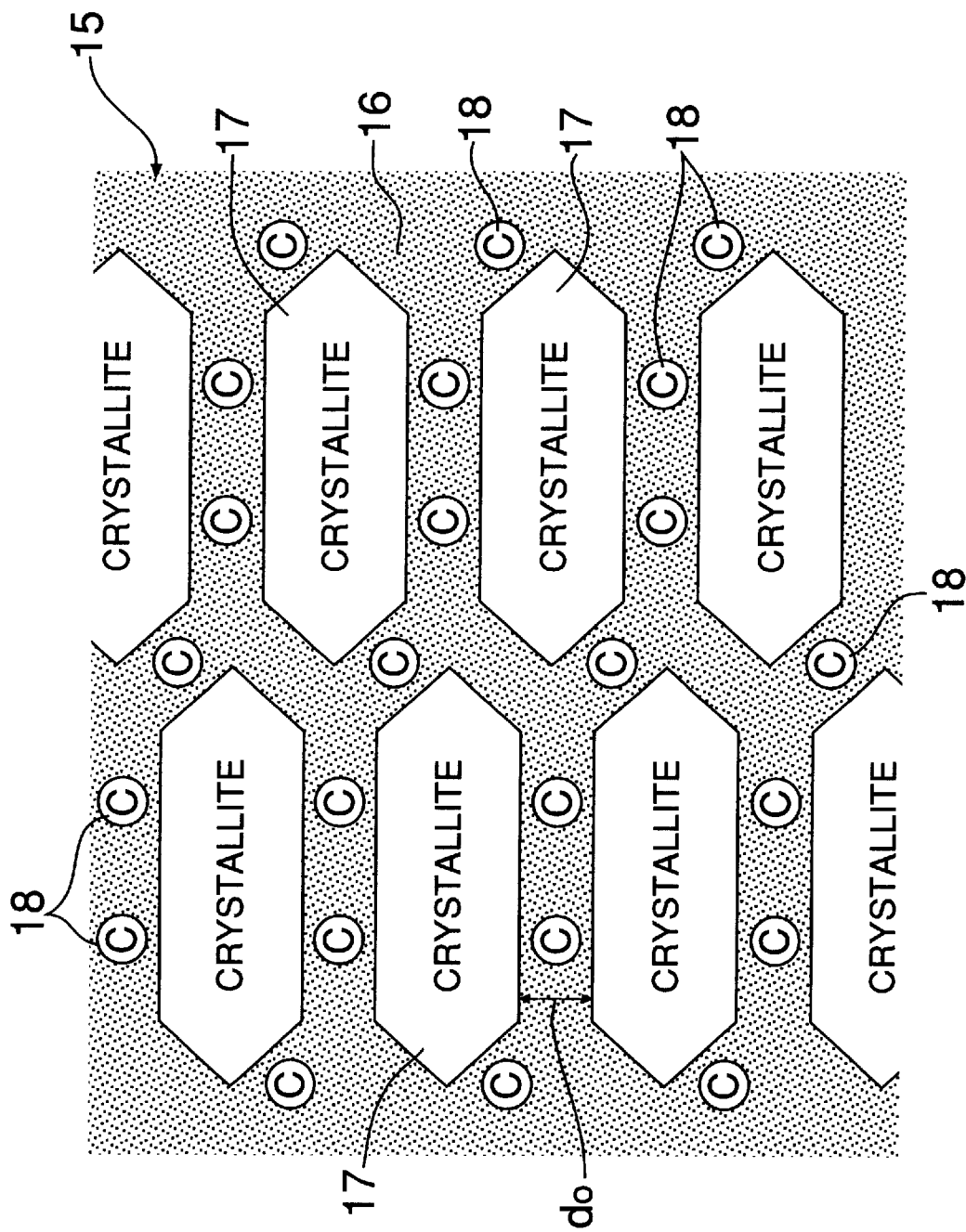
FIG. 3 is a diagram showing one example of a carbonized material.

As shown in FIG. 3, a plurality of crystallites 17 having a graphite structure are dispersed in amorphous carbon 16 in the carbonized material 15 produced from the carbon material. A plurality of carbon atoms 18 produced from the particular numbers of the aliphatic hydrocarbon radical R and the alicyclic hydrocarbon structure moiety ALC (e.g., —$CH_2$—$CH_2$—) exist between the adjacent crystallites 17, and a very small distance $d_o$ is generated between the adjacent crystallites 17 by the presence of such carbon atoms 18. In the alkali activating treatment, sites where the very small distances $d_o$ are generated become starting points for forming pores, and the removal of carbon atoms is conducted in such sites. Thus, it is possible to produce activated carbon for an electrode, in which pores are distributed uniformly and which has a relatively high density and a relatively small specific surface area.

Figure 4:
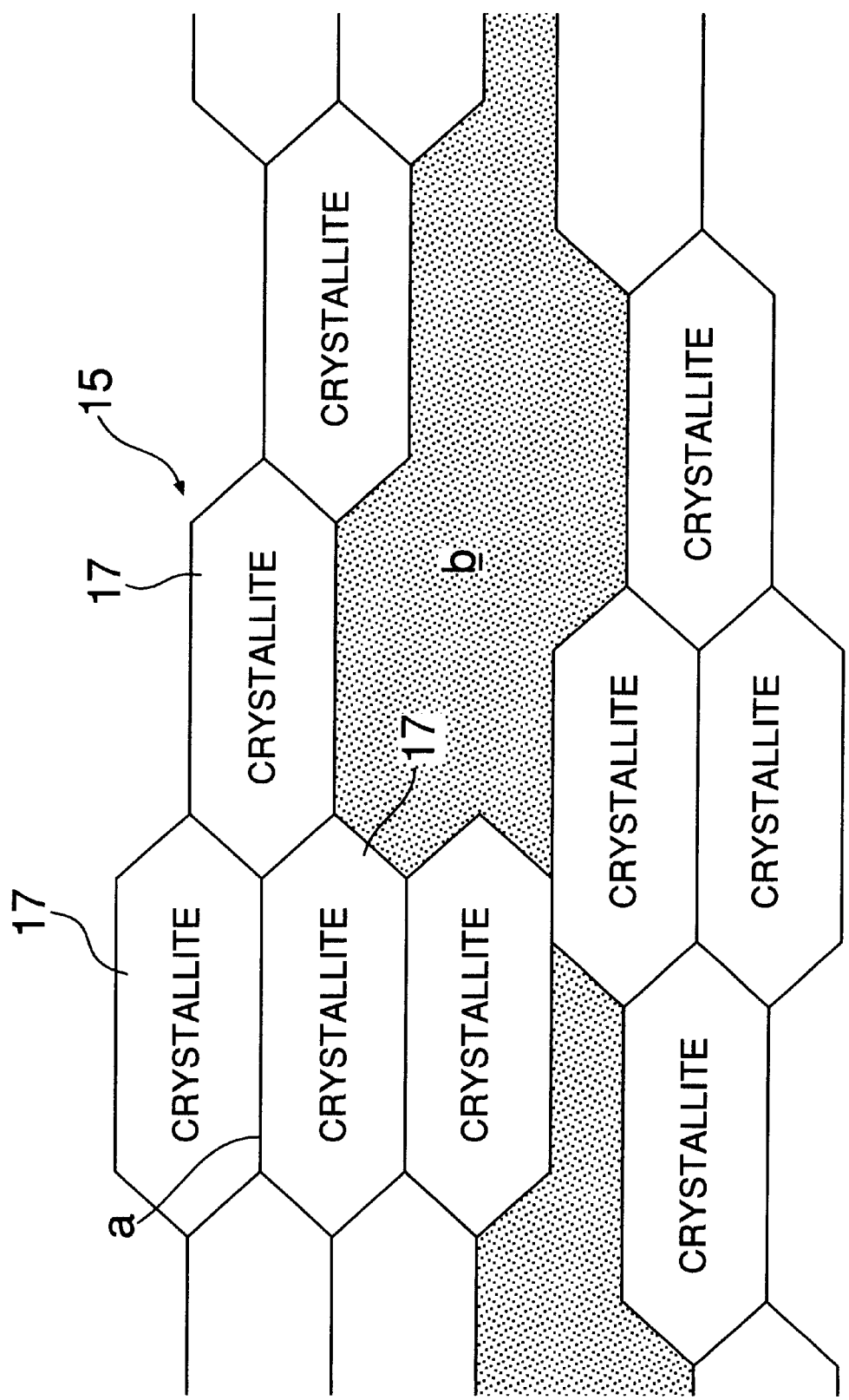
FIG. 4 is a diagram showing another example of a carbonized material.

As shown in FIG. 4, in a carbonized material 15 having no particular number of aliphatic hydrocarbon radical R or the like, regions where the adjacent crystallites are in close contact with one aother and regions where the adjacent crystallites are spaced at a relatively wide distance apart from one another, are liable to be produced. In the alkali activating treatment, pores are difficultly formed in the close contact regions a, while pores are easily formed in the spaced-apart regions b and moreover liable to be enlarged. Therefore, the activated carbon for the electrode has a relatively low density and a relatively large specific surface area.

Particular examples will be described below.

[I] Preparation of Carbon Material

First and second carbon materials were synthesized using methylnaphthalene as a source material, and a third carbon material was synthesized using naphthalene as a source material. The carbon materials were subjected to an analysis using a $^{13}$C-NMR spectroscopy to provide analysis charts shown in FIG. 5. Analysis conditions are as follows: About 0.5 grams of each of the carbon materials was placed, as it was, into a sample tube; a high-resolution solid probe was used; a measuring device was GSX-270 made by JOEL Ltd.; a reference substance was 0 ppm of trimethyl silane; $^{13}$C irradiation frequency was 67.80 MHz; a proton-exciting pulse width was 4 $\mu$S; a contact time was 5,000 $\mu$S; and MAS was 6,000 Hz by methods of CPMAS.

Figure 5:
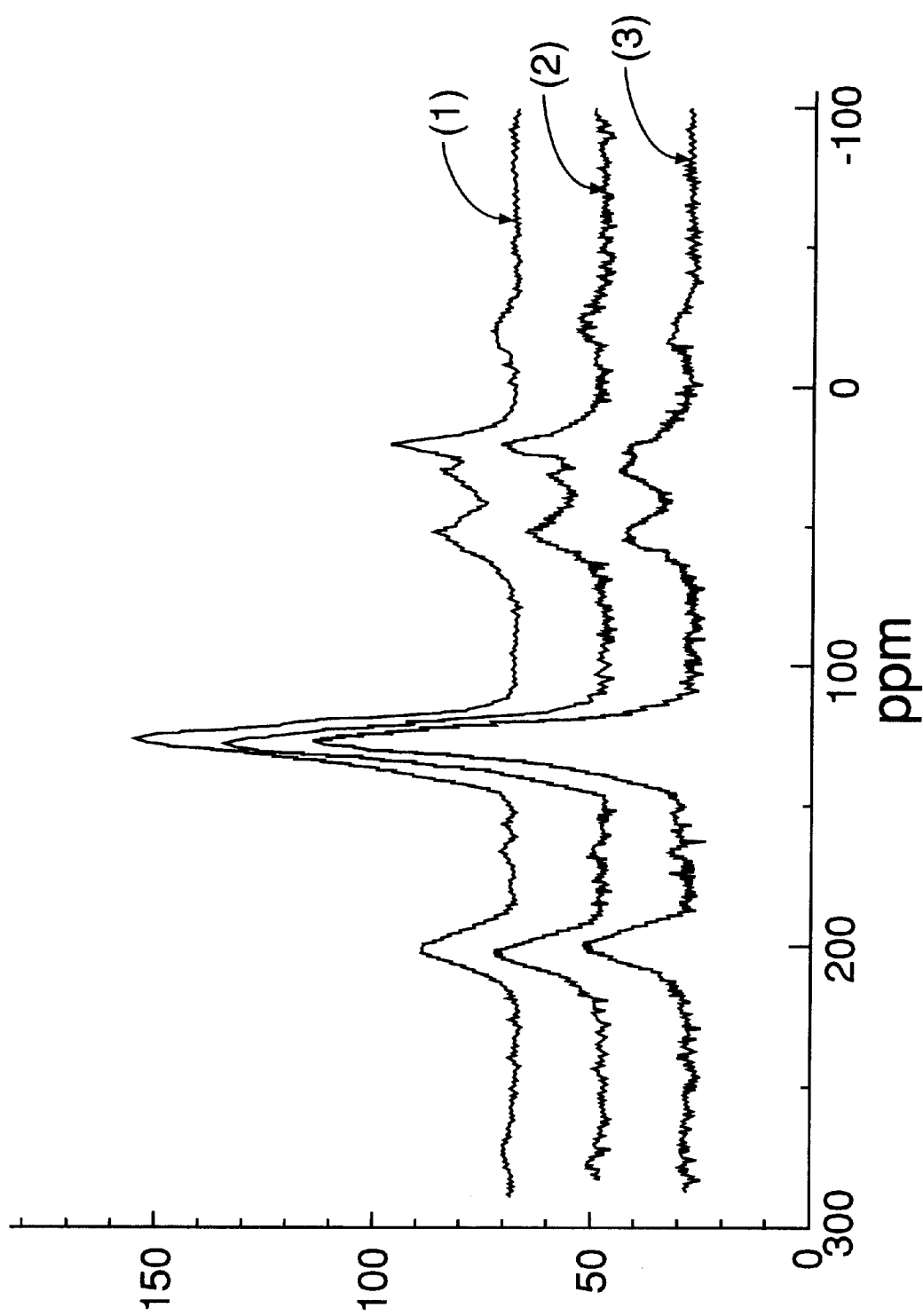
FIG. 5 is an analysis chart provided by a $^{13}$C-NMR spectroscopy.

In FIG. 5, Line (1) corresponds to the first carbon material; Line (2) corresponds to the second carbon material, and Line (3) corresponds to the third carbon material. A signal intensity $I_R$ of an aromatic peak appearing in a range of 100 to 160 ppm, a signal intensity $I_L$ of an aliphatic hydrocarbon peak appearing in a range of 30 to 5 ppm and a signal intensity $I_C$ of an alicyclic hydrocarbon peak appearing in a range of 40 to 25 ppm were determined, and signal intensity ratios $I_L/I_R$ and $I_C/I_R$ were calculated, thereby providing results shown in Table 1. Softening points for the first, second and third carbon materials are also shown in Table 1.

TABLE 1

|  | Signal intensity | | | Signal intensity ratio | | Softening point |
| --- | --- | --- | --- | --- | --- | --- |
|  | $I_R$ | $I_L$ | $I_C$ | $I_L/I_R$ | $I_C/I_R$ | $T_s$ (° C.) |
| First carbon material | 86.88 | 28.31 | 17.08 | 0.33 | 0.20 | 170 |
| Second carbon material | 86.93 | 23.82 | 12.70 | 0.27 | 0.15 | 250 |
| Third carbon material | 85.50 | 15.30 | 16.90 | 0.18 | 0.20 | 270 |

[II] Production of Activated Carbon for Electrode (a) 10 grams of a first massive carbon material was pulverized by a labo-cutter mill to provide a first powdery carbon material having an average particle size of about 0.5 mm. (b) The first powdery carbon material was spread on an upper surface of a retaining plate within an oven to thereby facilitate contact with oxygen. Then, air was supplied at 10 L/min into the oven, and the first powdery carbon material was subjected to an oxygen crosslinking treatment in which the temperature was raised at 1° C./min, maintained at 140° C. for 3 hours, and then maintained at 170° C. for 3 hours. Thereafter, an oxygen crosslinking rate $D_L$ of the first powdery carbon material was determined. (c) The first powdery carbon material resulting from the oxygen crosslinking treatment was placed in a carbonizing furnace, where it was subjected to a carbonizing treatment in the presence of nitrogen current in which the temperature was raised at 200° C./hr, and maintained at 700° C. for 1 hour, to provide a carbonized material. A true density d of the carbonized material was measured by a specific gravity conversion process. (d) The carbonized material was subjected to a pulverizing treatment using a labo-cutter mill to provide a powdery carbon material having an average particle size $D_P$ nearly equal to 20 $\mu$m. (e) 5 grams of a KOH pellet having a purity of 85% was added to 2.5 grams of the powdery carbon material to prepare a mixture having a weight ratio of KOH/C equal to 2. Then, the mixture was charged into a boat made of nickel, and the boat was placed into a tubular furnace, where the mixture was subjected to an alkali activating treatment in which the temperature was raised at 200° C./hr, maintained in the presence of a nitrogen current at 450° C. for 3 hours, and then maintained at 800° C. for 3 hours. The boat was removed from the tubular furnace. The treated powder was subjected to HCl washing, warm water washing, filtration and drying, thereby obtaining activated carbon for an electrode having an average particle size of about 20 $\mu$m. The activated carbon for the electrode is called Example (1).

A specific surface area A and a pore volume $V_P$ of Example (1) were measured. A BET process was utilized in the measurement of the specific surface area A. The pore volume $V_P$ was measured using a gas adsorption process and determined from pore distribution data provided by a one-point measuring process. More specifically, about 0.1 gram of a sample was taken from Example (1) and subjected to an evacuating treatment at 300° C. for about 6 hours. Then, a distribution of pores was measured using a pore distribution measuring device (made by SHIMADZU CORPORATION, under a trade name of ASSP2010 and having an analysis software V2.0 for analyzing a distribution of pores), and a pore volume $V_P$ was then determined.

Subsequently, Examples (2) to (6) of activated carbons for an electrode according to the present invention were produced under producing conditions different from those for Example (1), and Comparative Examples (1) to (4) were produced using the third carbon material. The producing conditions for Examples (2) to (6) are shown in Table 2, and those for Comparative Examples (1) to (4) are shown in Table 3. The producing conditions for Example (1) are also shown in Table 2.

TABLE 2

| Activated carbon for electrode | Carbon material | Oxygen cross-linking treatment | Carbonizing treatment | Alkali activating treatment | KOH/C |
|---|---|---|---|---|---|
| Example (1) | First | 1° C./hr; 140° C. - 3 hr, | 200° C./hr; 700° C. - 1 hr, | 200° C./hr; 450° C. - 3 hr, 800° C. - 3 hr | 2 |
| Example (2) | | 170° C. - 3 hr | | 200° C./hr; 450° C. - 3 hr, 850° C. - 3 hr | |
| Example (3) | | | | 200° C./hr; 450° C. - 3 hr, 730° C. - 3 hr | |
| Example (4) | | | 200° C./hr; 750° C. - 1 hr | 200° C./hr; 450° C. - 3 hr, 800° C. - 3 hr | 2.2 |
| Example (5) | second | 2° C./hr; 250° C. - 3 hr, 300° C. - 3 hr | | 200° C./hr; 450° C. - 3 hr, 730° C. - 3 hr | 2 |
| Example (6) | | | | 200° C./hr; 450° C. - 3 hr, 800° C. - 3 hr | |

TABLE 3

| Activated carbon | Carbon material | Oxygen cross-linking treatment | Carbonizing treatment | Alkali activating treatment | KOH/C |
|---|---|---|---|---|---|
| Comparative Example (1) | Third | 3° C./hr; 280° C. - 3 hr | 200° C./hr; 700° C. - 1 hr | 200° C./hr; 450° C. - 3 hr, 800° C. - 3 hr | 2 |
| Comparative Example (2) | | | | 200° C./hr; 450° C. - 3 hr, 850° C. - 3 hr | |
| Comparative Example (3) | | | | 200° C./hr; 450° C. - 3 hr, | |
| Comparative Example (4) | | | | 730° C. - 3 hr | 2.2 |

[III] Fabrication of Button-type Double-layer Capacitor

Example (1), a carbon black (conductive filler) and PTFE (binder) were weighed so that a weight ratio of 90:5:5 was provided. Then, the weighed materials were kneaded together and then subjected to a rolling to fabricate an electrode sheet having a thickness of 185 μm. A density of the electrode sheet was measured. This density is called an electrode density. A pair of polarizing electrodes 3 and 4 each having a diameter of 20 mm were cut out from the electrode sheet, and a button-type electric double-layer capacitor 1 shown in FIG. 1 was fabricated using the two polarizing electrodes 3 and 4, a spacer 5 made of PTFE and having a diameter of 20 mm and a thickness of 75 μm, an electrolyte and other material. A 1.8 M solution of triethylmethyl ammonium.tetrafluoroborate [$(C_2H_5)_3CH_3NBF_4$] in propylene carbonate was used as the electrolyte. Nine button-type electric double-layer capacitors were also fabricated in a similar process using Examples (2) to (6) and Comparative Examples (1) to (4).

[IV] Electrostatic Capacity Density of Activated Carbon for Electrode

An electrostatic capacity-revealing voltage was determined for each of the button-type electric double-layer capacitors. The button-type electric double-layer capacitors were subjected to a charging/discharging test in which the charging for 120 minutes and the discharging for 20 minutes at a current density of 5 mA/cm² were conducted based on such electrostatic capacity-revealing voltage. An electrostatic capacity density (F/cc) of each of the activated carbons for the electrodes was determined in an energy conversion process.

The oxygen crosslinking rate $D_L$ of the carbon material, the true density d of the carbonized material, the specific surface area A, the pore volume $V_P$, the electrostatic capacity revealing voltage and the electrostatic capacity density (F/cc) of the activated carbon, and the electrode density for Examples (1) to (6) are shown in Table 4, and those for Comparative Examples (1) to (4) are shown in Table 5.

TABLE 4

| Activated carbon | Carbon material: Oxygen crosslinking rate $D_L$ (%) | Carbonized material: true density d (g/cc) | Activated carbon Specific surface area A (m²/g) | Pore volume $V_P$ (cc/g) | Electrostatic capacity revealing voltage (V) | Electrostatic capacity density (F/cc) | Electrode density (g/cc) |
|---|---|---|---|---|---|---|---|
| Example (1) | 0.55 | 1.53 | 307 | 0.17 | 2.7 | 41.7 | 1.07 |
| Example (2) | 0.55 | 1.53 | 305 | 0.17 | 2.7 | 41.0 | 0.99 |
| Example (3) | 0.55 | 1.53 | 335 | 0.19 | 2.7 | 40.0 | 0.97 |
| Example (4) | 0.55 | 1.54 | 120 | 0.11 | 2.7 | 40.6 | 1.22 |
| Example (5) | 6.00 | 1.53 | 340 | 0.19 | 2.7 | 35.5 | 1.03 |
| Example (6) | 6.00 | 1.53 | 367 | 0.20 | 2.7 | 39.8 | 0.98 |

TABLE 5

| Activated carbon | Carbon material: Oxygen crosslinking rate $D_L$ (%) | Carbonized material: true density d (g/cc) | Activated carbon | | | | |
|---|---|---|---|---|---|---|---|
| | | | Specific surface area A (m²/g) | Pore volume $V_P$ (cc/g) | Electrostatic capacity revealing voltage (V) | Electrostatic capacity density (F/cc) | Electrode density (g/cc) |
| Comparative Example (1) | 6.50 | 1.54 | 590 | 0.29 | 2.7 | 30.3 | 0.87 |
| Comparative Example (2) | 6.50 | 1.54 | 603 | 0.29 | 2.7 | 23.2 | 0.86 |
| Comparative Example (3) | 6.50 | 1.54 | 770 | 0.39 | 2.7 | 33.5 | 0.86 |
| Comparative Example (4) | 6.50 | 1.54 | 800 | 0.40 | 2.7 | 32.3 | 0.82 |

As apparent from Tables 4 and 5, it can be seen that, in Examples (1) to (6) of the activated carbons made using the carbon material having the signal intensities IL/IR≧0.2 and IC/IR 0.14, the electrostatic capacity revealing voltage is as high as 2.7 V, as compared with 4 V in the prior art, and the electrostatic capacity density (F/cc) is as extremely high as 35 F/cc or more.

In any of Examples (1) to (6), the electrode density is in a range of 0.98 to 1.22 g/cc, which is about 13 to 40% higher than that of Comparative Example (1) providing a highest electrode density among all the Comparative Examples. Therefore, Examples (1) to (6) are dense, as compared with Comparative Examples (1) to (4). In any of Examples (1) to (6), the electrostatic capacity density (F/cc) is remarkably high, in spite of the specific surface area smaller than those of Comparative Examples (1) to (4). This means that electricity was accumulated efficiently in a small number of the pores. These facts reveal that it is possible to produce a polarizing electrode having a smaller size and a higher capacity using any of Examples (1) to (6).

Although the embodiments of the present invention have been described in detail, it will be understood that the present invention is not limited to the above-described embodiments, and various modifications in design may be made without departing from the spirit and scope of the invention defined in the claims.

What is claimed is:

1. A process for producing activated carbon for an electrode of an electric double-layer capacitor, comprising the steps of:

subjecting a carbon material to a carbonizing treatment; and then subjecting the carbon material to an alkali activating treatment;

wherein the carbon material used is a condensed polycyclic aromatic compound which has a condensed ring and at least one aliphatic hydrocarbon radical bonded to said condensed ring, said condensed ring including at least one alicyclic hydrocarbon structure moiety; and wherein, in an analysis chart resulting from a $^{13}$C-NMR spectroscopy of the condensed polycyclic aromatic compound, a signal intensity ratio $I_L/I_R$ is equal to or larger than 0.2, and a signal intensity ratio $I_C/I_R$ is equal to or larger than 0.14, wherein $I_R$ represents a signal intensity of an aromatic peak; $I_L$ represents a signal intensity of an aliphatic hydrocarbon peak; and $I_C$ represents a signal intensity of an alicyclic hydrocarbon peak.

2. A carbon material for use in the production of activated carbon for an electrode of an electric double-layer capacitor, which is a condensed polycyclic aromatic compound having a condensed ring and at least one aliphatic hydrocarbon radical bonded to said condensed ring, said condensed ring including at least one alicyclic hydrocarbon structure moiety, said condensed polycyclic aromatic compound providing, as a result of a $^{13}$C-NMR spectroscopy thereof, an analysis chart in which a signal intensity ratio $I_L/I_R$ is equal to or larger than 0.2, and a signal intensity ratio $I_C/I_R$ is equal to or larger than 0.14, wherein $I_R$ represents a signal intensity of an aromatic peak; $I_L$ represents a signal intensity of an aliphatic hydrocarbon peak; and $I_C$ represents a signal intensity of an alicyclic hydrocarbon peak.

* * * * *